United States Patent
Carlton et al.

(10) Patent No.: US 7,634,350 B2
(45) Date of Patent: Dec. 15, 2009

(54) AUTOMATIC CONFIGURATION FOR A SECONDARY ENGINE ELECTRONIC GOVERNOR

(75) Inventors: Douglas J. Carlton, Peoria, IL (US); Aaron M. Mahaffey, Eureka, IL (US)

(73) Assignee: Caterpillar Inc., Peoria, IL (US)

( * ) Notice: Subject to any disclaimer, the term of this patent is extended or adjusted under 35 U.S.C. 154(b) by 552 days.

(21) Appl. No.: 11/606,180

(22) Filed: Nov. 30, 2006

(65) Prior Publication Data

US 2008/0133117 A1 Jun. 5, 2008

(51) Int. Cl.
*F02D 41/26* (2006.01)
(52) U.S. Cl. .................................................. 701/114
(58) Field of Classification Search ............. 701/114, 701/115, 102, 101; 123/352
See application file for complete search history.

(56) References Cited

U.S. PATENT DOCUMENTS

| | | | |
|---|---|---|---|
| 4,004,648 A * | 1/1977 | Joseph et al. ............. | 180/14.3 |
| 4,532,594 A | 7/1985 | Hosaka et al. | |
| 4,748,566 A | 5/1988 | Sasaki et al. | |
| 4,785,403 A | 11/1988 | Kuhlberg | |
| 4,791,569 A * | 12/1988 | Suzuki ....................... | 701/102 |
| 5,546,306 A | 8/1996 | Hirabayashi et al. | |
| 5,605,135 A | 2/1997 | Netherwood | |
| 5,992,379 A | 11/1999 | Brüdigam et al. | |
| 6,278,932 B1 | 8/2001 | Bäumel et al. | |
| 6,281,664 B1 * | 8/2001 | Nakamura et al. ............. | 322/22 |
| 6,321,127 B1 | 11/2001 | Kondo | |
| 6,336,439 B1 | 1/2002 | Frohn et al. | |
| 6,525,432 B2 | 2/2003 | Heckmann et al. | |
| 6,529,805 B2 | 3/2003 | Aldrich, III et al. | |
| 6,628,993 B1 | 9/2003 | Bauer | |
| 6,629,022 B1 | 9/2003 | Gessner et al. | |
| 6,694,242 B2 | 2/2004 | Wong | |
| 6,707,392 B1 | 3/2004 | Melton | |
| 6,823,251 B1 | 11/2004 | Giers | |
| 6,965,817 B2 | 11/2005 | Graham et al. | |
| 2004/0093870 A1 | 5/2004 | Hara | |
| 2004/0149269 A1 | 8/2004 | Karem | |
| 2005/0159869 A1 | 7/2005 | Tohdo et al. | |

FOREIGN PATENT DOCUMENTS

| | | |
|---|---|---|
| DE | 2824190 | 12/1979 |
| DE | 4315494 | 9/1994 |
| FR | 2526484 | 11/1983 |
| JP | 57-155603 | 9/1982 |

* cited by examiner

*Primary Examiner*—Hieu T Vo
(74) *Attorney, Agent, or Firm*—Finnegan, Henderson, Farabow, Garrett & Dunner

(57) ABSTRACT

A control system for a machine having an engine is disclosed. The engine has a first electronic governor. The first electronic governor is operable to control the engine. The engine also has a memory including predetermined configuration data. The engine also has a second electronic governor. The second electronic governor is operable to control the engine. The second electronic governor is connected to the first electronic governor via a datalink. The second electronic governor is configured to automatically receive the predetermined configuration data from the first electronic governor.

20 Claims, 3 Drawing Sheets

AUTOMATIC CONFIGURATION FOR A SECONDARY ENGINE ELECTRONIC GOVERNOR

TECHNICAL FIELD

The present disclosure relates generally to the configuration of a propulsion engine's electronic governor, and more particularly, to the automatic configuration of a secondary electronic governor for a propulsion engine.

BACKGROUND

A modern machine (e.g., a stationary or a mobile machine, such as a construction machine, fixed engine system, marine-based machine, etc.) includes an on-board network and associated machine electronic governors. An on-board network typically includes many different electronic modules connected to various types of communication links. These links can be proprietary and non-proprietary, such as manufacturer-based data links and communication paths based on known industry standards (e.g., J1939, RS232, RP 1210, RS-422, RS-485, MODBUS, CAN, etc.).

The electronic governors also receive data from and transmit data to external systems using the communication links to control one or more components and/or operations of the machine. For example, display modules receive sensor data from a first engine electronic governor via a J1939 data link, while a second electronic governor connected to a proprietary data link provides data to another module connected to the same link. Also, an on-board module sends data to an off-board system using a different communication path extending from the machine to the off-board system. However, these electronic modules must be properly configured in order to achieve their purposes.

Currently, for marine-based machines where the engine could be a single point of failure, the Marine Society requires two engine electronic governors (ECMs). In this configuration, the first engine electronic governor is utilized as a primary governor to control the marine-based machine under normal operation. If the primary governor (ECM) fails, the second governor (ECM), serving as backup, takes over control of the propulsion engine. In order for both primary and secondary governors (ECMs) to operate properly under normal and failure conditions, they must be configured similarly. Existing tools have been developed, which allow an engine user or dealer to separately connect to both the primary ECM and the secondary ECM and configure the data manually. Manual individual configuration by end users or dealers can result in improper system setup and in potentially unreliable or unsafe secondary engine electronic governors (ECM).

One alternative method of programming a secondary control unit is described in U.S. Pat. No. 6,965,817 (the '817 patent) issued to Graham et al. on Nov. 15, 2005. The '817 patent describes a control system for a marine vessel having one or more engines. The system in the '817 patent includes one or more control units, each of which is electro-mechanically coupled to an engine and a transmission. A first control unit includes input means for receiving an electrical signal, control means for controlling a throttle of a first engine and shift position of a first transmission based on the electrical signal, and output means for providing a control signal that represents a current position of a control arm to a second engine electronic governor. The second control unit is coupled to the first control unit via the communications link, and includes input means for receiving the control signal from the first control unit, and control means for controlling the throttle of a second engine and the shift position of a second transmission based on the control signal from the first control unit.

According to the system in the '817 patent, each engine control unit includes a memory that contains a flag indicating whether the control unit is the master electronic governor or a slave electronic governor. Each control unit also includes a memory that contains a flag indicating whether the system is in sync mode. If the system is in sync mode, the slave electronic governor ignores the position data it receives from its corresponding control lever, and sets its corresponding actuator rods using the control/lever position data it receives from the master electronic governor. If the system is not in sync mode, the slave electronic governor sets its corresponding actuator rods using the position data it receives from its corresponding control lever.

Although the system of the '817 patent uses a master electronic governor in order to configure a slave electronic governor, the secondary engine electronic governor does not serve as backup to the master electronic governor in case of failure. Moreover, the system in the '817 patent, while allowing an operator to synchronize control of two different power trains by keeping both engines at the same throttle positions and both transmissions at the same shift position, it does not contemplate the scenario in which the master electronic governor fails or is unavailable and the slave electronic governor has to take over, which requires identical configuration for proper operation.

The disclosed system is directed to overcoming one or more of the problems set forth above.

SUMMARY OF THE INVENTION

In one aspect, the present disclosure is directed to a control system. The control system includes an engine. The engine includes a first electronic governor. The first electronic governor is operable to control the engine and includes a memory. The memory includes predetermined configuration data. The engine also includes a second electronic governor. The second electronic governor is operable to control the engine. The second electronic governor is connected to the first electronic governor via a datalink. The second electronic governor is configured to automatically receive the predetermined configuration data from the first electronic governor.

In another aspect, the present disclosure is directed to a method for automatically configuring a backup electronic governor. The method includes transmitting, upon power-up, a datalink identifier from a primary electronic governor to a backup electronic governor. The method further includes automatically programming the second electronic governor to an identifier corresponding to the transmitted datalink identifier. The method also includes automatically transmitting configuration data stored in the primary electronic governor to the backup electronic governor over the datalink.

DETAILED DESCRIPTION

Figure 1:
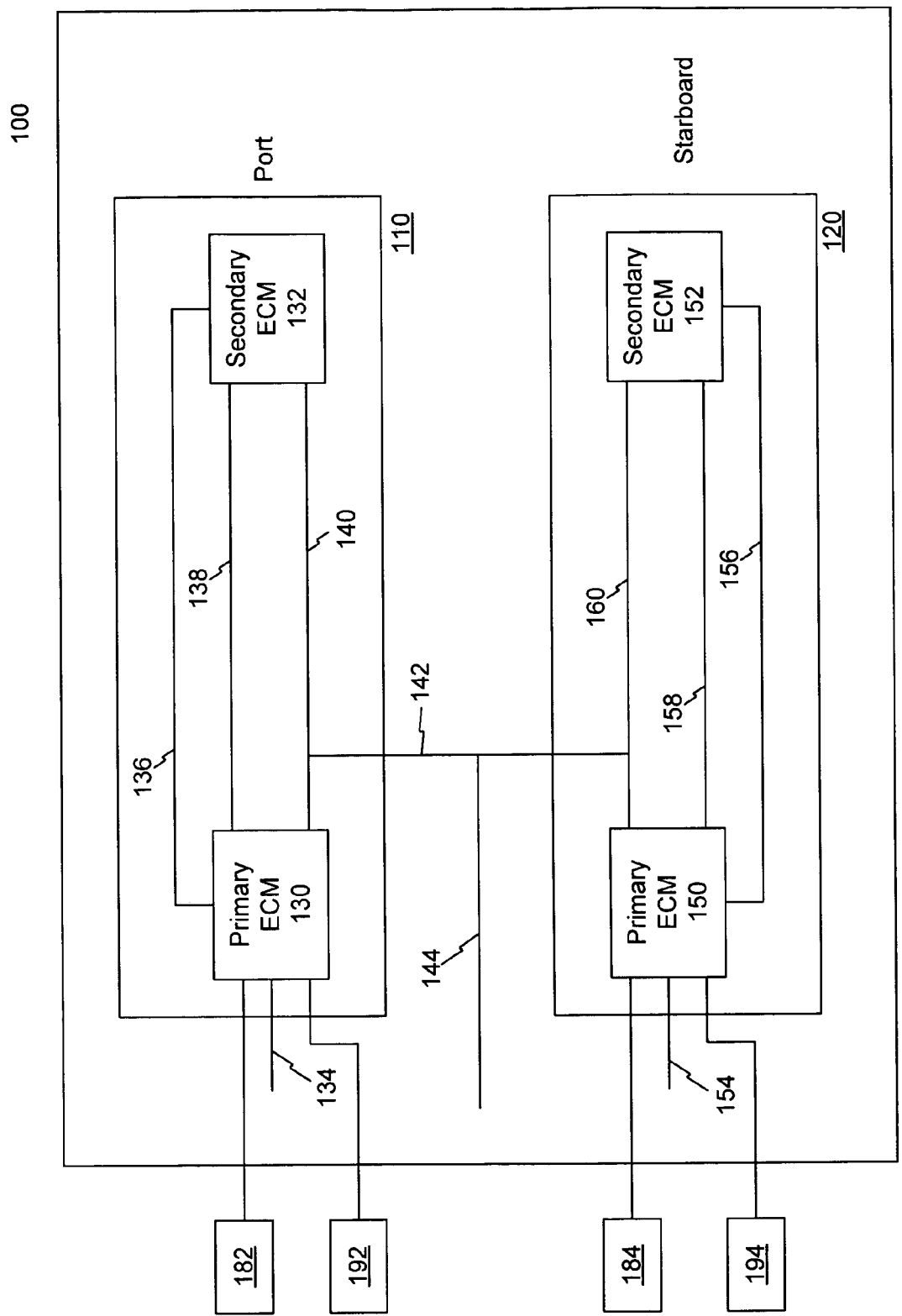
FIG. 1 is a block illustration of an exemplary control system for automatically configuring a secondary engine electronic governor.

FIG. 1 illustrates an exemplary machine 100 in which features and principles consistent with certain disclosed embodiments may be incorporated. Machine 100 may refer to any type of stationary or mobile machine that performs some type of operation associated with a particular industry, such as mining, construction, farming, transportation, etc. and operates between or within work environments (e.g., construction site, mine site, power plants and generators, on-highway applications, etc.). Non-limiting examples of mobile machines include vehicles, such as buses, trucks, cranes, earth moving equipment, mining machines, backhoes, material handling equipment, farming equipment, marine vessels, and any type of movable machine that operates in a work environment. Machine 100 may also include any type of non-commercial vehicle such as passenger cars, vans, and other vehicles. Although, as shown in FIG. 1, machine 100 is a marine-based machine, it is contemplated that machine 100 may be any type of machine.

As shown in FIG. 1, due to Marine Society regulations, marine-based type machines may require two engines. Machine 100 may include a first engine 110 and a second engine 120. Engines 110 and 120 may include any appropriate type of engine or power source that generates power for machine 100, such as an internal combustion engine or fuel cell generator. In an exemplary embodiment, engines 110 and 120 may be C32 ACERT engines, manufactured by Caterpillar Inc.

Engine 110, may be configured as the "port" engine. Port engine 110 may include a first or primary electronic governor (ECM) 130 and second or backup electronic governor (ECM) 132. ECMs 130 and 132 may include any appropriate type of engine control system configured to perform engine control functions such that first engine 110 may operate properly. ECMs 130 and 132 may include any number of devices, such as microprocessors or microcontrollers, memory modules, communication devices, input/output devices, storages devices, etc., to perform such control functions. Further, ECMs 130 and 132 may also control other systems of machine 100, such as transmission systems, and/or hydraulics systems, etc. Computer software instructions may be stored in or loaded to ECMs 130 and 132, and ECMs 130 and 132 may utilize the computer software instructions to perform various control functions and processes. However, under normal conditions, primary ECM 130 may fully control the operation of machine 100, while secondary ECM 132 may serve only as a backup controller.

Primary ECM 130 and secondary ECM 132 may be connected by a plurality of data links, including datalinks 136, 138, and 140. Additionally, primary ECM 130 may be connected to a datalink 134. Datalinks 134-140 may be proprietary or non-proprietary, and may comprise manufacturer-based data links and communication paths based on known industry standards (e.g., J1939, RS232, RP 1210, RS-422, RS-485, MODBUS, CAN, etc.).

Engine 120, may be configured as the "starboard" engine. Starboard engine 120 may include first or primary electronic governor (ECM) 150 and second or backup electronic governor (ECM) 152. ECMs 150 and 152 may include any appropriate type of engine control system configured to perform engine control functions such that second engine 120 may operate properly. ECMs 150 and 152 may include any number of devices, such as microprocessors or microcontrollers, memory modules, communication devices, input/output devices, storages devices, etc., to perform such control functions. Further, ECMs 150 and 152 may also control other systems of machine 100, such as transmission systems, and/or hydraulics systems, etc. Computer software instructions may be stored in or loaded to ECMs 150 and 152, and ECMs 150 and 152 may utilize the computer software instructions to perform various control functions and processes. However, under normal conditions, primary ECM 150 may be fully employed, while secondary ECM 152 may serve only as backup.

Primary ECM 150 and secondary ECM 152 may be connected by a plurality of data links, including datalinks 156, 158, and 160. Additionally, primary ECM 150 may be connected to a datalink 154. Datalinks 154-160 may be proprietary or non-proprietary, and may comprise manufacturer-based data links and communication paths based on known industry standards (e.g., J1939, RS232, RP 1210, RS-422, RS-485, MODBUS, CAN, etc.).

Primary ECMs 130 and 150 may be coupled to data links 134 and 154, respectively. Datalinks 134 and 154 may be configured to receive data from and send data to other components of machine 100, such as engines 110 and 120, respectively, sensors, and/or any other components (not shown) of machine 100. Data links 134 and 154 may include any appropriate type of data communication medium, such as cable, wires, wireless radio, and/or laser, etc. It is also contemplated that data links 134 and 154 may be proprietary or non-proprietary, and may comprise manufacturer-based data links and communication paths based on known industry standards (e.g., J1939, RS232, RP 1210, RS-422, RS-485, MODBUS, CAN, etc.).

Primary ECMs 130 and 150 may communicate with one or more engine components (not shown) that manage or monitor different operational parameters, such as engine speed, temperature, oil pressure, etc. These engine components may comprise any combination of hardware, sensors, controllers, and/or software. For example, these engine components may include a temperature control software module for determining and regulating engine temperature or an oil pressure control software module for determining and regulating oil pressure.

Primary ECMs 130 and 150 may also communicate with one or more external components 182 and 184 that request engine state information from ECMs 130 and 150. External components 182 and 184 may comprise any combination of hardware, sensors controllers, and/or software modules. For example, external components 182 and 184 may be systems that require engine state information, but are not directly related to engine operations (e.g., other on-board machine systems, such as systems for controlling machine attachments or operator display systems, for example).

Primary ECMs 130 and 150 may additionally communicate with off-board systems using off-board communications components 192 and 194. Off-board communications components 192 and 194 may format state information into any appropriate format, as needed, for transmission to off-board systems. Transmission to off-board systems may be accomplished wirelessly over an antenna (not shown), for example. Wireless communications may include satellite, cellular, infrared, and any other type of wireless communication. Alternatively, off-board communications components 192 and 194 may directly interface with an off-board system through a data port (not shown), such as an Ethernet port. For example, an Ethernet port may deliver a message to an external device (not shown) that is connected to the data port. The external device may then transmit the response over one of many different networks (e.g., cellular, satellite, 802.11, etc.).

In operation, primary ECMs 130 and 150 may also manage or control an operating state of engines 110 and 120, respectively. The functions managed by ECMs 130 and 150 may include starting and shutdown sequences associated with various motors. ECMs 130 and 150 may determine a state of engines 110 and 120 and the determined engine state may be used by one or more of engine components and/or external components that require engine state information.

In order to perform these functions, ECMs 130 and 150 may receive configuration data from a user, manufacturer or engine dealer via datalink 144. A user, manufacturer, or engine dealer may customize an ECM with variations of configuration data, such as engine size, machine dimensions, engine displacement, optional equipment, load factors, communication protocols, target market, and sensor types and positioning. The particular configuration data set must be generated, selected, and downloaded to ECMs 130 and 150 for supporting a desired operation of the ECMs.

Alternatively, ECMs 130 and 150 may be manufactured to provide the specific ECM configuration for each different machine configuration. For example, an ECM with a specific configuration data setting may be produced for each of the different machine configurations and stored at the machine assembly plant.

Data link 142 may be utilized to transmit the initial configuration to both primary ECM 130 and primary ECM 150. Primary ECMs 130 and 150 may determine a configuration state based on analysis of the received configuration data. The determined state may then be communicated to any other components, such as any software modules of engine components and/or external components, that require configuration state information.

Figure 2:
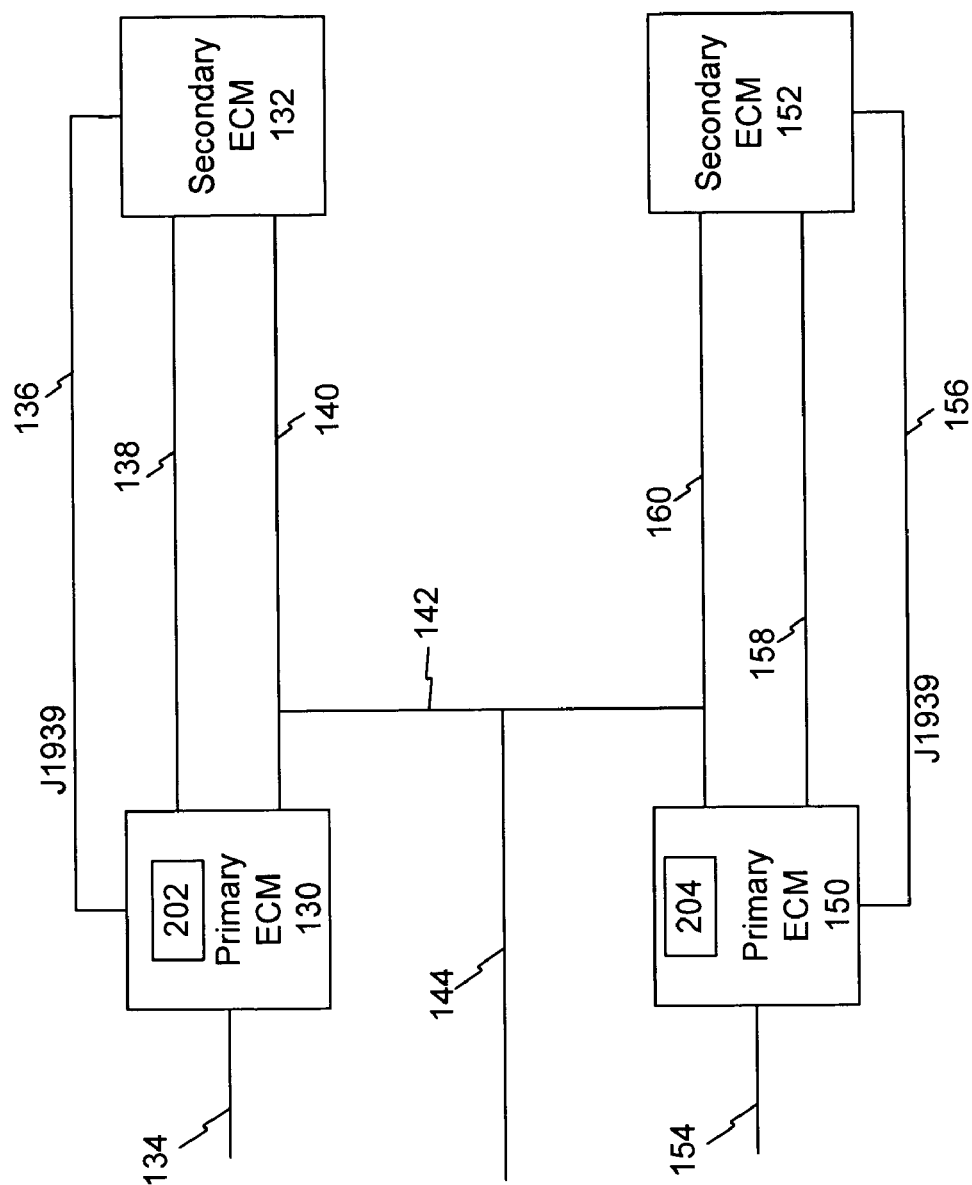
FIG. 2 is a schematic illustration of architecture included in the control system, for automatically configuring the secondary engine electronic governor, of FIG. 1.

FIG. 2 is an exemplary architecture for providing control of configuration functions, consistent with a disclosed embodiment. Software architecture may be stored in memories 202 and 204, for example. In one embodiment, memories 202 and 204 may store received program instructions to perform a process to configure secondary electronic governors 132 and 152. To do so, the program instructions may be in the form of one or more software modules written using any known programming language, such as C++, XML.

ECMs 130 and 150 may use a product operational control file to perform their functions. The product operational control file may be any type of file whose content may be interpreted by a program in an ECM, a component of a product, or a product. The product operational control file may access configuration data from the ECM's memory device 202 or 204, such as a flash memory or an erasable programmable read only memory (EPROM). ECM's memory devices 202 and 204 may contain data reflecting part information, communication protocols supported by the ECM, and other configuration data settings supported by a product.

Instructions stored in memories 202 and 204 may also be used to determine a current configuration state of engines 110 and 120. Primary ECMs 130 and 150 may be connected in advance to secondary ECMs 132 and 152, respectively, via data links 136 and 156. Datalinks 136 and 156 may be J1939 datalinks, connected between the primary and secondary electronic governors (ECMs), but not between the two engines (i.e., port and starboard engines 110 and 120). This connection may allow ECMs 130 and 150 to communicate with ECMs 132 and 152 on the same engine and to identify itself as, for example, as the port or starboard engine primary ECM. The identifiers of datalinks 136 and 156 may be transmitted to secondary ECMs 132 and 152. The datalink identifiers may be matched for transmitting predetermined configuration data from primary ECMs 130 and 150 to secondary ECMs 132 and 152, respectively.

For example, upon first power-up of engines 110 and 120 and upon successful datalink identifier matching, the instructions stored in memories 202 and 204 may be used to access the current configuration state of engines 110 and 120. In addition, upon first power-up, the configuration data from memories 202 and 204 in primary ECMs 130 and 150 may be transmitted to secondary ECMs 132 and 152 via datalinks 136 and 156, respectively.

The described implementations include software, but systems and methods may also or alternatively be implemented as a combination of hardware and software or in hardware alone. Examples of hardware include computing or processing systems, including personal computers, servers, laptops, mainframes, microprocessors and the like. Additionally, although aspects of the invention are described for being stored in memory, one skilled in the art will appreciate that these aspects can also be stored on other types of computer-readable media, such as secondary storage devices, for example, hard disks, floppy disks, or CD-ROM, the Internet or other propagation medium, or other forms of RAM or ROM.

Computer programs based on the written description and methods of the disclosed embodiments are within the skill of an experienced developer. The various programs or program modules can be created using any of the techniques known to one skilled in the art or can be designed in connection with existing software. For example, program sections or program modules can be designed in or by means of Java, C++, HTML, XML, or HTML with included Java applets. One or more of such software sections or modules can be integrated into a computer system or browser software.

It is also contemplated that the present method may be performed by implementing other approaches for detecting a primary engine electronic governor. For example, it is contemplated that a secondary engine electronic governor may recognize a primary electronic governor by detecting a certain number of electric pulses sent from the primary electronic governor, over a predetermined amount of time, in order to properly detect and identify the presence of the primary electronic governor.

Figure 3:
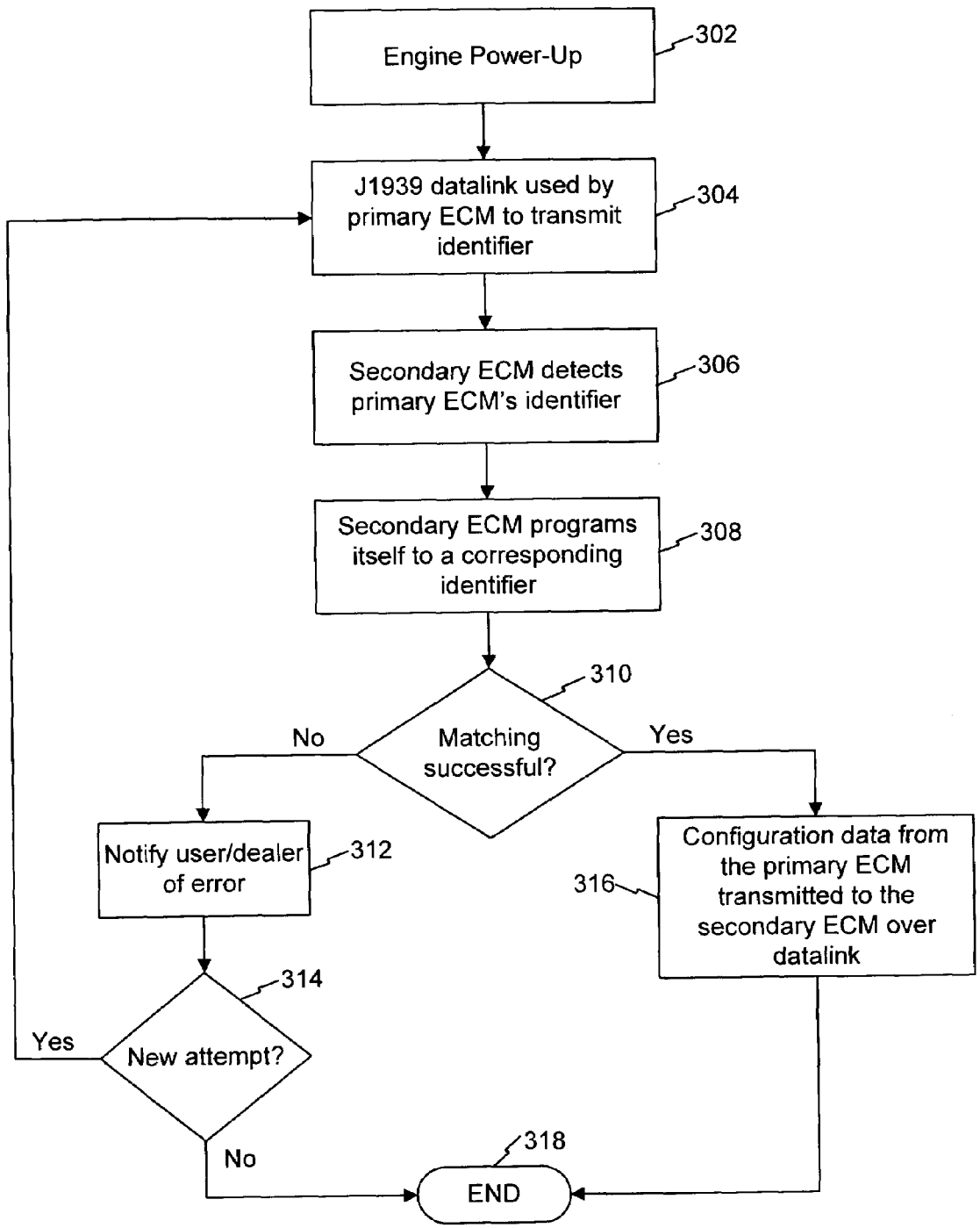
FIG. 3 is a flow chart illustrating an exemplary disclosed method of operating the control system for automatically configuring the secondary engine electronic governor of FIG. 1.

FIG. 3 illustrates a flowchart 300 depicting an exemplary method for providing automatic configuration of a secondary engine electronic governor. The method depicted in flowchart 300 will be described in more detail below.

INDUSTRIAL APPLICABILITY

The disclosed method and system may provide configuration of a secondary electronic governor (ECM) for an engine in a marine-based machine. In particular, the disclosed method and system may be used to implement an automatic configuration method without need for a user or dealer to individually configure each electronic governor. In this manner, a primary electronic governor, which is normally in control of the marine-based machine, may automatically transmit its configuration data to a secondary electronic governor, which may take over propulsion engine control in the event the primary engine electronic governor fails. By avoiding individual manual ECM configuration, the likelihood of human mistake or misconfiguration may be minimized. Improper or faulty configuration, may prevent the secondary electronic governor (ECM) from properly taking over control of the engine during faulty conditions.

As illustrated in FIG. 3, upon initial power-up of port propulsion engine 110 (Step 302), (ECM) 130 may utilize datalink 136 to transmit its correct datalink identifier to ECM 132 (Step 304). For example, ECM 130 may identify itself as the port primary electronic governor. ECM 132 may then detect the correct identifier of ECM 130 (Step 306) and automatically program itself to a corresponding datalink identifier (Step 308). For example, ECM 132 may program itself to be the port secondary electronic governor. The method may then include evaluating if the datalink identifiers were successfully matched (Step 310) (i.e., are both the port primary and secondary ECMs identified). If the datalink identifiers were not matched correctly, the method may inform the user or dealer of a configuration error (Step 312). This notification may be provided in response to implementing program instructions stored in memory. It is also contemplated that this notification may be provided by visual means, such as a system display. The user or dealer may determine whether a new attempt to match the datalink identifiers will be performed.

If a new attempt to match the identifiers is desired by the engine user or dealer, the primary electronic governor (ECM) 130 may again utilize the J1939 datalink 136 to transmit its correct datalink identifier on the dedicated datalink (Step 314). If a new attempt to match the datalink identifiers is undesired, the configuration process may end (Step 318).

If the datalink identifiers are correctly matched, configuration data from the primary electronic governor (ECM) 130 may be automatically transmitted to the secondary electronic governor 132 over datalink 140 (Step 316). The configuration data may reflect part information, communication protocols supported by the ECM, and other configuration data settings supported by a particular part of product. Additionally, this configuration data may refer to information represented in a form suitable for processing by an ECM to control one or more components in a product. For example, ECM 130 may be an A4E4 model, including two J1939 datalinks, and may indicate to ECM 132 that port engine 110 is a C32 ACERT engine, manufactured by Caterpillar Inc.

The configuration data may also include configuration parameters. Configuration parameters may refer to a piece of configuration data assigned a specific value for the operations of a component and/or product. For example, port engine 110 may include a lubrication circuit with a maximum allowable oil pressure of 300 mPa. This parameter (i.e., 300 mPa) may be transmitted from ECM 130 to ECM 132 by way of a data file.

In case the master electronic governor fails or is unavailable, the slave electronic governor (i.e., ECM 132) has to take over the control functions of port engine 110. In order for the slave electronic governor to take over, its configuration must be identical to that of the master electronic governor (i.e., ECM 130). The present method may provide automatic configuration of the slave electronic governor with identical data to that of the master electronic governor, without the need for a user or dealer to individually configure both electronic governors.

It will be apparent to those skilled in the art that various modifications and variations can be made to the method and system of the present disclosure. Other embodiments of the method and system will be apparent to those skilled in the art from consideration of the specification and practice of the method and system disclosed herein. The values and types of data described above are exemplary and are not intended to be limiting to the disclosed embodiments. It is intended that the specification and examples be considered as exemplary only, with a true scope of the disclosure being indicated by the following claims.

What is claimed is:

1. A control system for a machine, the system comprising:
    an engine;
    a first electronic governor operable to control the engine and having a memory with predetermined configuration data stored thereon; and
    a second electronic governor operable to control the engine, connected to the first electronic governor via a datalink, and configured to automatically receive the predetermined configuration data from the first electronic governor.

2. The system of claim 1, wherein the predetermined configuration data is programmed in advance of engine operation.

3. The system of claim 1, wherein upon power-up of the engine, the first electronic governor is configured to transmit a datalink identifier to the second electronic governor.

4. The system of claim 3, wherein, the second electronic governor is configured to detect the datalink identifier and automatically program itself to a corresponding identifier.

5. The system of claim 4, wherein the configuration data is received only in response to successful matching of datalink identifiers.

6. The system of claim 5, wherein the configuration data includes at least one of product part information, communication protocols supported by the first and second electronic governors, and data settings supported by the engine.

7. The system of claim 6, wherein the configuration data further includes at least one parameter specifying values for operation of the engine.

8. The system of claim 6, wherein the second electronic governor is configured to function as a backup governor and control operation of the engine only in the event the first electronic governor fails.

9. A computer-readable medium, tangibly embodied, storing instructions executable by a processor for automatic configuration of a backup electronic governor in an engine comprising:
    transmitting, upon power-up of the engine, a datalink identifier from a primary electronic governor to the backup electronic governor;
    automatically programming the backup electronic governor to an identifier corresponding to the transmitted datalink identifier; and
    automatically transmitting configuration data stored in the primary electronic governor to the backup electronic governor.

10. The computer-readable medium of claim 9, wherein the configuration data is programmed in advance of engine operation.

11. The computer-readable medium of claim 10, further including determining whether the datalink identifiers of the primary and backup electronic governors substantially match.

12. The computer-readable medium of claim 11, wherein the configuration data is automatically transmitted only in response to the determination.

13. The computer-readable medium of claim 12, wherein the configuration data includes at least one of product part information, communication protocols supported by the primary and backup electronic governors, and data settings supported by the engine.

14. The computer-readable medium of claim 13, wherein the configuration data further includes at least one configuration parameter specifying values for the operation of the engine.

15. The computer-readable medium of claim 14, further including enabling the backup electronic governor to control the engine in the event the primary electronic governor fails.

16. A method for automatically configuring a backup electronic governor in an engine, comprising:
- transmitting, upon power-up of the engine, a datalink identifier from a primary electronic governor to the backup electronic governor;
- automatically programming the backup electronic governor to an identifier corresponding to the transmitted datalink identifier; and
- automatically transmitting configuration data stored in the primary electronic governor to the backup electronic governor.

17. The method of claim 16, further including determining whether the datalink identifiers of the primary and backup electronic governors substantially match, wherein the configuration data is automatically transmitted only in response to the determination.

18. The method of claim 17, wherein the configuration data includes at least one of product part information, communication protocols supported by the primary and backup electronic governors, and data settings supported by the engine.

19. The method of claim 18, wherein the configuration data further includes at least one configuration parameter specifying values for the operation of the engine.

20. The method of claim 19, further including enabling the backup electronic governor to control the engine in the event the primary electronic governor fails.

* * * * *